April 4, 1961 F. A. MORGAN 2,978,016
TIRE DEMOUNTING APPARATUS
Filed Oct. 27, 1958 2 Sheets-Sheet 1

INVENTOR.
FRANK A. MORGAN
BY

April 4, 1961  F. A. MORGAN  2,978,016
TIRE DEMOUNTING APPARATUS
Filed Oct. 27, 1958  2 Sheets-Sheet 2
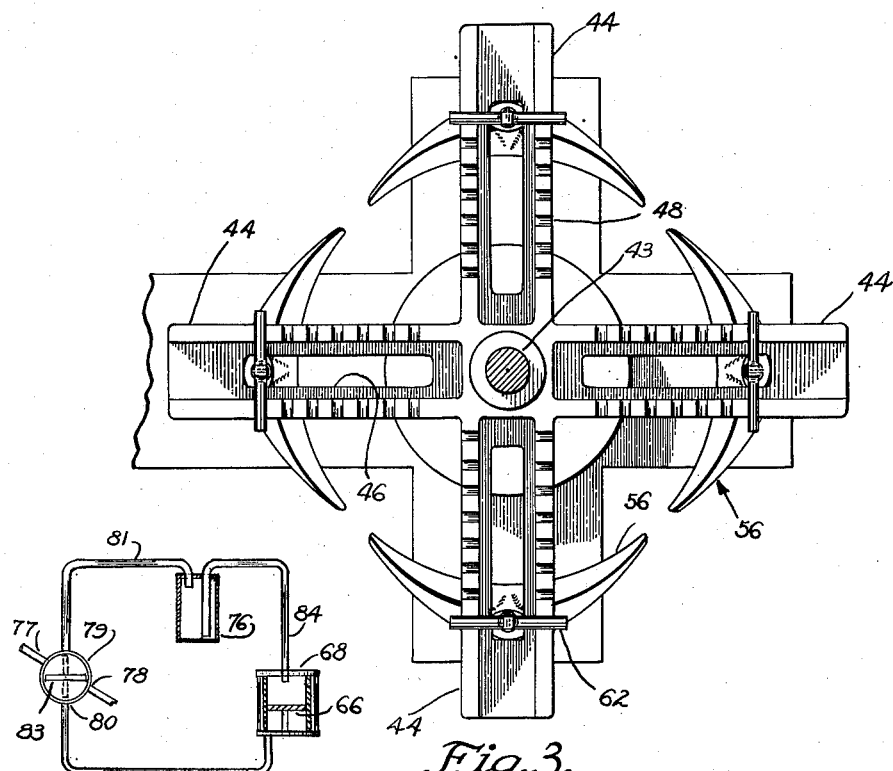
Fig. 3.
Fig. 5.
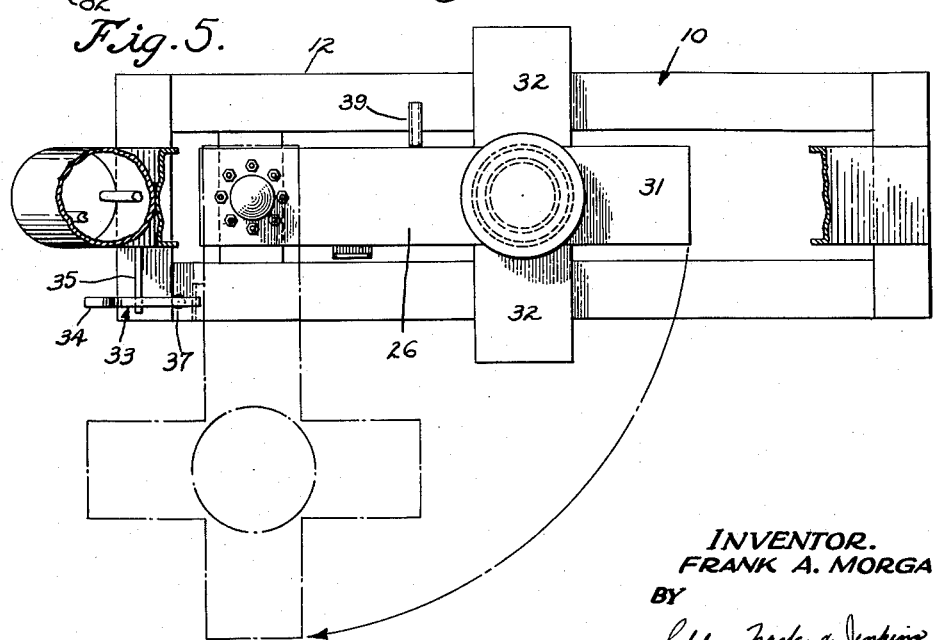
Fig. 4.
INVENTOR.
FRANK A. MORGAN
BY United States Patent Office 2,978,016
Patented Apr. 4, 1961

2,978,016
TIRE DEMOUNTING APPARATUS
Frank A. Morgan, 519 E. 23rd St., Anderson, Ind.
Filed Oct. 27, 1958, Ser. No. 769,704
3 Claims. (Cl. 157—1.2)

This invention relates to an apparatus for removing tires from the wheels upon which they are mounted, and has for its object the provision of an apparatus which will completely remove a tire from the wheel upon which it is mounted, which will quickly and easily effect such a removal without injury to the tire, and which is easily and quickly adjustable for use with a plurality of tire sizes.

According to the preferred form of my invention, there is provided a supporting frame structure comprising a base and an overhanging frame disposed above said base. Conveniently, a wheel-supporting work-table is swingably interconnected to said base and is adapted to be swung from a position of easy access for tire loading to a tire-removing position underlying the overhanging frame structure. A power cylinder mounted on the overhanging frame structure actuates a ram having a spider connected to its lower end and carrying a plurality of shovels. The shovels extend downwardly from the spider arms so that upon downward movement of the spider the shovels will bear against a tire supported on the work-table to strip said tire from its wheel.

The accompanying drawings illustrate my invention. In such drawings:

Fig. 3 is a horizontal section taken on the line 3—3 of Fig. 1;

Fig. 4 is a plan view of the apparatus illustrated in Fig. 1, with portions thereof broken away to show the work-table supporting arm; and Fig. 5 is a diagrammatic showing of the ram actuating control system.

Figure 1:
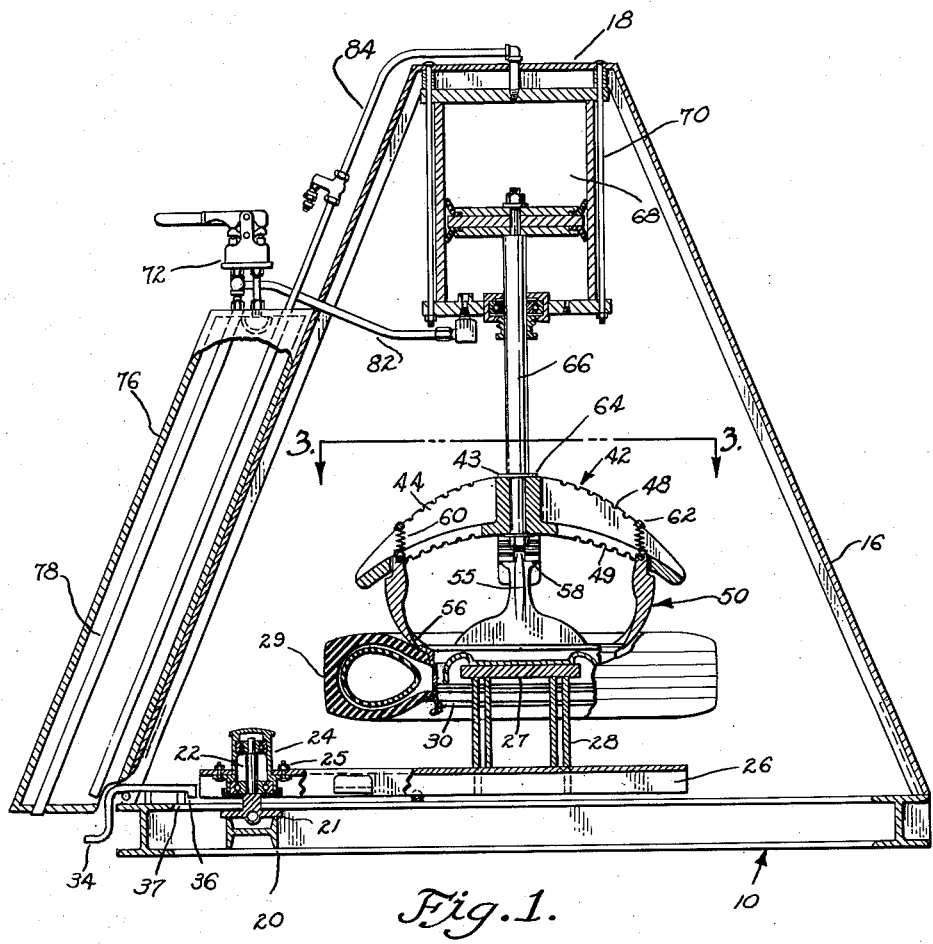
Fig. 1 is a side elevation partly in section showing a tire demounting apparatus embodying my invention.
Figure 2:
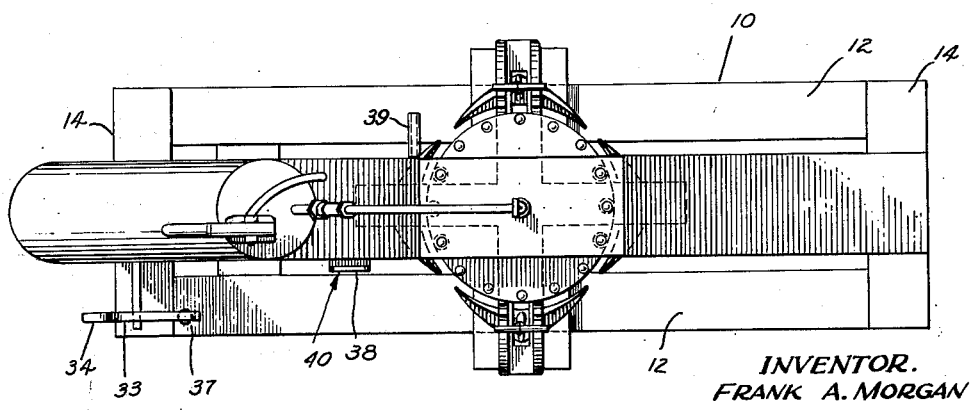
Fig. 2 is a top plan view of the apparatus shown in Fig. 1.

As illustrated in the drawings, my apparatus for demounting tires comprises a supporting frame structure having a base 10 conveniently formed from a pair of laterally spaced I-beams 12 connected at their ends as by transverse beams 14. Extending obliquely upwardly from the ends of the beams 12 are a pair of struts 16 interconnected at their upper ends by a cross brace 18 and constituting an overhanging supporting frame disposed above the base 10.

The beams 12 are further interconnected adjacent one of their ends by a transverse member 20 having a bracket 21 rigidly mounted on the upper face thereof. The bracket 21 is provided with an upwardly projecting stud 22 journaled within a socket 24 rigidly connected, as by bolts 25, to one end of a horizontally disposed arm 26 adapted to be rotated about the axis of the stud 22. A work-table 27 having a plurality of legs 28 is mounted on the arm 26 adjacent the end of the arm opposite the socket 24 for supporting a tire 29 and wheel 30 in a work-position above the base 10. Preferably, the table 27 has a diameter such that the rim of the wheel 30 supported thereon will extend well beyond the edge of the table. The outer end 31 of the arm 26 and a pair of supports 32 extend radially outwardly from table legs 28 to receive the tire 29 after it has been removed from the wheel 30.

My device is primarily adapted to be used on truck tires and wheels which employ wheels having a demountable rim flange. On such wheel structures the rim flange is first removed and then the tire may be stripped from the wheel in the manner hereinafter set forth. On wheel structures having a drop center rim, the radial extension of the rim flanges prevents stripping the tire away from the wheel. However, my device may be used on such wheel structures to break the tire beads loose from the rim flanges for subsequent manual removal of the tire.

Conveniently, the swinging movement of the arm 26 from a tire-loading position shown in chain link lines in Fig. 4 to a tire-removing position in which the work-table 27 is disposed below the overhanging frame structure is limited by a pair of stop means. To this end, a stop 39 is mounted on the base 10 to engage the arm 26 for disposing the work-table in an operative tire-removing position in vertical alignment with base 10 and overhanging frame structures 16 and 18. And swinging movement of the arm 26 to a tire-loading position is limited by a stop 33 supported on a bracket 35 mounted on the base 10. The stop 33 is pivotally mounted on the bracket 35 with one of its ends 34 projecting outwardly beyond the base 10 and its opposite end being provided with a latch 36 supported above the base on a post 37. The latch 36 is engageable with an upturned lip 38 on a catch 40 mounted on the arm 26, so that as the arm 26 swings outwardly into the tire-loading position the catch 40 forces the stop 33 to pivot about the axis of the bracket 35 with the lip 38 being retained between the latch 36 and the post 37 to releasably lock the arm 26 in its tire-loading position. Conversely, a downward force applied to the end 34 of the stop 33 will cause said stop to pivot on the bracket 35 to release the latch 36 from the lip 38 and permit the arm 26 to be swung inwardly to the full line position shown in Fig. 4.

Disposed above the base 10 is a spider 42 comprising a hub 43 and a plurality of arms 44 radiating outwardly from said hub. Each of the arms 44 is provided with a longitudinal slot 46 extending through said arm. A plurality of transverse grooves 48 and 49 are formed in the upper and lower faces respectively of each of the arms 44. A vertically extending shovel or thrust member 50 is adjustably mounted on each of the arms 44 and is adapted to transmit a downward thrust from the spider to the tire 29 for stripping said tire from the wheel 30. Each of the trust members comprises a vertical shank 55 having a presser-foot 56 at its lower end, said presser-foot preferably having a fish-tail form as shown in Fig. 3. The upper end of the shank 55 is provided with upwardly facing shoulders 58 engageable with the transverse grooves 49. The shoulders 58 are held in engagement with the grooves 49 by a coil spring 60 interconnecting the upper end of the shank 55 to a cross-pin 62 receivable in the transverse grooves 48. Thus, to dispose a thrust member 50 at the proper radial distance from the hub 43, it is merely necessary to place the pin 62 in the desired groove 48 and then exert a downward force on the thrust member extending the spring 60 and permitting the shoulders 58 to be seated in the desired groove 49. In this manner, the springs 60 acting between the pins 62 and the shoulders 58 on the thrust members releasably lock said thrust members in the arm grooves 48 and 49, while permitting said thrust members to bear against the lower faces of the spider arms 44 and pivot about the axes of the grooves 49 during operation of the device.

The hub 43 is provided with the vertical bore 64 for interconnecting the spider 42 to the lower end of a ram 66 actuated by a double-acting power cylinder 68. The cylinder 68 is mounted on the cross brace 18 by a plurality of bolts 70 to support the cylinder, and thus the spider, in a position above the work-table 27 when said table is disposed in an operative tire-removing position. Conveniently, the power cylinder 68 is actuated by a combined pneumatic-hydraulic system controlled by a conventional four-way valve 72 mounted on a hydraulic fluid reservoir 76 secured to the frame. As diagramed in Fig. 5, the valve 72 has a compressed air inlet port 77 and an opposed vent port 78, said vent port being illustrated in Fig. 1 as a pipe vented at the bottom of the reservoir 76. Interposed between the ports 77 and 78 are a pair of opposed ports 79 and 80, the port 79 communicating with a pipe 81 connected to the top of the reservoir 76 and the port 80 communicating with a pipe 82 leading to the bottom of the power cylinder 68. The reservoir and the power cylinder are interconnected by means of a pipe 84 extending between the lower end of the reservoir and the top of the cylinder 68. The valve 72 is shown in Fig. 5 with its plug 83 in a ram-lowering position with the ports 77 and 79 in communication and the ports 78 and 80 in communication. In this valve position air is forced through the pipe 81 into the reservoir 76 to force the hydraulic fluid from said reservoir through the pipe 84 into the cylinder 68 to lower the ram 66, with the air disposed below the ram 66 in the cylinder leaving said cylinder through the pipe 82 and the valve ports 80 and 78. Conversely, movement of the valve plug 83 into the dotted line position shown in Fig. 5 causes a reverse air and fluid movement for raising the ram 66.

Operation of my device may be described as follows: The arm 26 is swung outwardly into its tire-loading position shown in chain link lines in Fig. 4, where it is releasably locked by means of the locking mechanism 36—38. A tire 29 mounted on its wheel 30 is placed on the work-table 27 with the demountable wheel rim flange removed. The locking mechanism on the arm is released, and the arm is swung inwardly to a tire-removing position below the spider 42. The valve 72 is then actuated to force the hydraulic fluid in the reservoir 76 through the pipe 84 into the power cylinder 68, causing the ram 66 to move the spider downwardly. As the spider is lowered, the presser-feet 56 on the shovels 50 bear against the upper surface of the tire 29 forcing said tire downwardly to remove it from the wheel 30. The length of vertical travel of the spider 42 is such that presser-feet 56 on the shovels move completely through the horizontal plane of the wheel 30 to strip the tire therefrom. The valve 72 is then actuated to force the air through the pipe 82 into the lower portion of the cylinder 68 to raise the spider upwardly away from the wheel 30. The arm 26 is then swung outwardly with the wheel 30 being supported on the worktable 27 and the tire being supported on the radially extending members 31 and 32 of said arm. In this outwardly disposed position, the separated wheel and tire can quickly and easily be removed from the worktable and arm.

I claim as my invention:

1. An apparatus for demounting tires, comprising a supporting structure having a base and an overhanging frame disposed above said base, a spider interconnected to said overhanging frame and vertically movable with respect to said supporting structure, a plurality of radially extending arms on said spider, a pivotal thrust member adjustably mounted on each of said spider arms and movable therewith for removing a tire from a wheel supported in a work-position below said thrust members, means to retain each of said thrust members in operative bearing contact with the lower face of its respective arm and freely swingable about its connection to said spider arm, and power means interconnecting said spider to the overhanging frame and imparting vertical movement thereto.

2. An apparatus as set forth in claim 1 with the addition that each of said spider arms is provided with a plurality of radially spaced grooves in its upper and lower faces, and each of said thrust members comprises a tire-engaging presser-foot, said retaining means releasably locking the thrust member in a pair of the opposed grooves in the upper and lower faces of one of said spider arms while permitting said thrust members to pivot with respect to said arms about the axes of the lower arm grooves in which the thrust members are received.

3. The apparatus set forth in claim 2 with the addition that the releasable locking means on said thrust member comprises a cross-pin engageable with the grooves in the upper face of one of the spider arms, a pair of shoulders engageable with the grooves in the lower face of said spider arm, and a spring interconnecting said cross-pin and shoulders to releasably retain the same in their respective grooves.

References Cited in the file of this patent

UNITED STATES PATENTS

| | | |
|---|---|---|
| 1,537,662 | Flick | May 12, 1925 |
| 2,536,139 | Ritter | Jan. 2, 1951 |
| 2,616,487 | Parks | Nov. 4, 1952 |
| 2,618,320 | Deysher et al. | Nov. 18, 1952 |
| 2,650,659 | Morgan | Sept. 1, 1953 |

FOREIGN PATENTS

| | | |
|---|---|---|
| 492,250 | France | July 2, 1919 |